United States Patent
Ariga et al.

(10) Patent No.: US 12,262,291 B2
(45) Date of Patent: Mar. 25, 2025

(54) VEHICLE MANAGEMENT SERVER, VEHICLE MANAGEMENT METHOD, AND NON-TRANSITORY STORAGE MEDIUM

(71) Applicant: TOYOTA JIDOSHA KABUSHIKI KAISHA, Toyota (JP)

(72) Inventors: Takanori Ariga, Nagoya (JP); Tomoyasu Ishikawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 17/932,842

(22) Filed: Sep. 16, 2022

(65) Prior Publication Data

US 2023/0011952 A1 Jan. 12, 2023

Related U.S. Application Data

(63) Continuation of application No. 17/006,221, filed on Aug. 28, 2020, now Pat. No. 11,516,638.

(30) Foreign Application Priority Data

Nov. 6, 2019 (JP) .................................. 2019-201575

(51) Int. Cl.
*H04W 4/46* (2018.01)
*H04W 4/80* (2018.01)

(52) U.S. Cl.
CPC ............... *H04W 4/46* (2018.02); *H04W 4/80* (2018.02)

(58) Field of Classification Search
CPC ........... H04W 4/46; H04W 4/80; H04W 4/48; H04W 4/021; H04W 4/029; H04W 4/40; H04L 67/12; H04L 67/52

USPC ......................................................... 455/41.2
See application file for complete search history.

(56) References Cited

U.S. PATENT DOCUMENTS

| 8,527,146 | B1 | 9/2013 | Jackson et al. |
| 10,348,598 | B2 | 7/2019 | Kawakami |
| 2017/0265044 | A1* | 9/2017 | Lundsgaard ............ H04W 4/40 |
| 2018/0074811 | A1* | 3/2018 | Kiyama .................. H04L 67/12 |

(Continued)

FOREIGN PATENT DOCUMENTS

| EP | 3476670 A1 | 5/2019 |
| JP | 2008-182564 A | 8/2008 |

(Continued)

*Primary Examiner* — Eugene Yun
(74) *Attorney, Agent, or Firm* — Oblon, McClelland, Maier & Neustadt, L.L.P.

(57) ABSTRACT

A vehicle management server configured to manage information on a control device mounted on a vehicle, and information on a plurality of information terminals connectable with the control device is provided. The vehicle management server includes: an acquisition unit configured to acquire information indicating a positional relationship between the information terminals and the control device; a determination unit configured to determine, based on the information indicating the positional relationship, whether or not there is a first information terminal that is out of a setting range that includes the control device among the information terminals; and a notification unit configured to transmit, based on whether or not there is the first information terminal, a first message to at least one second information terminal different from the first information terminal among the information terminals.

18 Claims, 9 Drawing Sheets

(56) References Cited

U.S. PATENT DOCUMENTS

| 2018/0201207 A1 | 7/2018 | Kim |
| 2018/0202826 A1 | 7/2018 | Takeuchi et al. |
| 2019/0265868 A1 | 8/2019 | Penilla |

FOREIGN PATENT DOCUMENTS

| JP | 2012-173902 A | 9/2012 |
| JP | 2014-15802 A | 1/2014 |
| JP | 5984168 B1 | 9/2016 |
| JP | 2018-117298 A | 7/2018 |

* cited by examiner

VEHICLE MANAGEMENT SERVER, VEHICLE MANAGEMENT METHOD, AND NON-TRANSITORY STORAGE MEDIUM

INCORPORATION BY REFERENCE

This application is a continuation of U.S. application Ser. No. 17/006,221, filed Aug. 28, 2020, the entire contents of which are incorporated herein by reference. U.S. application Ser. No. 17/006,221 claims the benefit of priority of Japanese Patent Application No. 2019-201575 filed on Nov. 6, 2019 including the specification, drawings and abstract all of which is incorporated herein by reference in its entirety.

BACKGROUND

1. Technical Field

The present disclosure relates to a vehicle management server, a vehicle management method, and a non-transitory storage medium.

2. Description of Related Art

In recent years, techniques of communicably connecting vehicles with information terminals, such as smartphones, and controlling the vehicles with the information terminals have been proposed. For example, Japanese Patent Application Publication No. 2018-117298 discloses a system configured to provide information regarding a residual energy amount of a vehicle by using the function of a mobile terminal that cooperates with the vehicle.

SUMMARY

Contract information regarding communication between a vehicle and an information terminal is generally registered and managed in the server or the like. However, in the case where the owner of a vehicle is changed by such reasons as transfer of the vehicle, the contract information regarding a transferrer (former user) remains in the server unless the transferrer himself cancels the contract of his information terminal. Since a transferee (new user) of the vehicle is unable to recognize whether or not the information terminal of the former user stays registered, the transferee may have an uneasy feeling.

The present disclosure provides a vehicle management server, a vehicle management method, and a non-transitory storage medium that enable a new user of a vehicle to recognize the possibility that an information terminal of a former user stays registered in association with the vehicle.

A first aspect of the present disclosure relates to a vehicle management server configured to manage information on a control device mounted on a vehicle, and information on a plurality of information terminals connectable with the control device. The vehicle management server includes an acquisition unit, a determination unit, and a notification unit. The acquisition unit is configured to acquire information indicating a positional relationship between the information terminals and the control device. The determination unit is configured to determine, based on the information indicating the positional relationship, whether or not there is a first information terminal that is out of a setting range that includes the control device, among the information terminals. The notification unit is configured to transmit, based on whether or not there is the first information terminal, a first message to at least one second information terminal different from the first information terminal among the information terminals.

In the first aspect, the control device may have a function of connecting to the information terminals by short distance wireless communication. The acquisition unit may be configured to acquire the information as the information indicating the positional relationship on the information terminals, connectable with the control device by the short distance wireless communication, from the control device. The determination unit may be configured to determine that, when there is an information terminal that is not included in the information on the information terminals acquired by the acquisition unit among the information terminals, the information terminal that is not included in the acquired information on the information terminals is out of the setting range.

In the above aspect, the acquisition unit may be configured to acquire, as the information indicating the positional relationship, location information from the information terminals and the control device. The determination unit may be configured to determine that, when there is an information terminal distanced by a set threshold or more from the control device among the information terminals, the information terminal distanced by the set threshold or more from the control device is out of the setting range.

In the above aspect, the acquisition unit may be configured to acquire, as the information indicating the positional relationship, location information from the information terminals and the control device. The determination unit may be configured to determine that, when there is an information terminal not located in the same block as that of the control device among the information terminals based on map information that defines a plurality of blocks, the information terminal not located in the same block as the control device is out of the setting range.

In the above aspect, the determination unit is configured to determine, based on the location information acquired by the acquisition unit, whether or not a movement trajectory of the second information terminal is matched with a movement trajectory of the control device. The notification unit may be configured to transmit, when the movement trajectory of the second information terminal is matched with the movement trajectory of the control device, the first message to the second information terminal.

In the above aspect, the notification unit may be configured to transmit, when the first information terminal is continuously out of the setting range for a set time or more, the first message to at least the second information terminal.

In the above aspect, the second information terminal may be an information terminal within the setting range.

In the above aspect, the notification unit may be configured to transmit, when the first information terminal is continuously out of the setting range for a set time or more, a second message to the first information terminal.

In the above aspect, the acquisition unit may be configured to periodically acquire the information as the information indicating the positional relationship on the information terminals, connectable with the control device by the short distance wireless communication, from the control device.

A second aspect of the present disclosure relates to a vehicle management method executed by a vehicle management server for managing information on a control device mounted on a vehicle, and information on a plurality of information terminals connectable with the control device. The vehicle management method includes: acquiring information indicating a positional relationship between a plurality of information terminals and a control device; determining, based on the information indicating the positional relationship, whether or not there is a first information terminal that is out of a setting range set based on the control device among the information terminals; and transmitting, based on whether or not there is the first information terminal, a first message to at least one second information terminal different from the first information terminal among the information terminals.

A third aspect of the present disclosure relates to a non-transitory storage medium for storing commands that are executable by one or more processors and that cause the one or more processors to execute following functions. The functions include: acquiring information indicating a positional relationship between a plurality of information terminals and a control device; determining, based on the information indicating the positional relationship, whether or not there is a first information terminal that is out of a setting range set based on the control device among the information terminals; and transmitting, based on whether or not there is the first information terminal, a first message to at least one second information terminal different from the first information terminal among the information terminals.

With each aspect of the present disclosure, a new user of the vehicle is able to recognize the possibility that the information terminal of a former user stays registered in association with the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A vehicle management server of the present disclosure periodically determines a positional relationship between a vehicle and a plurality of mobile devices present around the vehicle, the mobile devices being associated with the vehicle. When there is a mobile device that is out of a setting range from the vehicle, the vehicle management server notifies the presence of the mobile device having a low possibility of being connected to the vehicle. Hence, a new user who received the notification can recognize the possibility that the information terminal of a former user may stay registered in association with the vehicle.

Hereinafter, an embodiment of the present disclosure will be described in detail with reference to the drawings.

Figure 1:
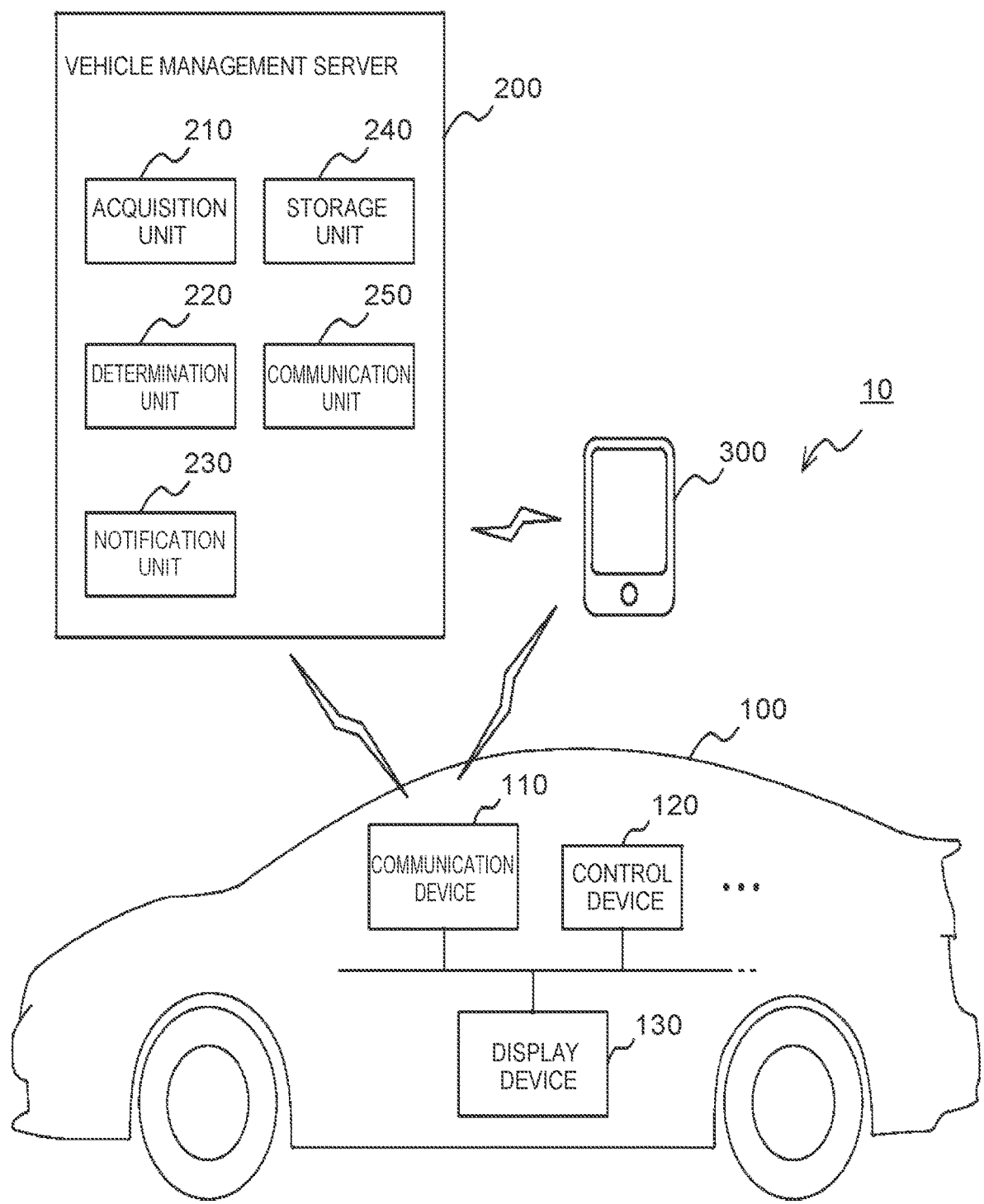
FIG. 1 shows a configuration example of a vehicle management system including a vehicle management server according to an embodiment of the present disclosure.

FIG. 1 shows a configuration example of a vehicle management system including a vehicle management server according to an embodiment of the present disclosure. A vehicle management system 10 illustrated in FIG. 1 includes a vehicle 100, a vehicle management server 200, and at least one mobile device 300. The vehicle 100 includes a communication device 110, a control device 120, and a display device 130.

The communication device 110 is communicably connected with the control device 120 and the display device 130 through an in-vehicle network, such as a controller area network (CAN). The communication device 110 is communicably connected with the vehicle management server 200 through a wireless network, such as 4G and Wi-Fi, and is communicably connected with the mobile device 300 by short distance wireless communication, such as Bluetooth (registered trademark). Examples of the communication device 110 may include a data communication module (DCM).

In one example, the control device 120 is a device called an electronic control unit (ECU) that performs various control of the vehicle 100. The control device 120 such as an ECU includes a storage unit (not illustrated) that stores one or more programs executed by one or more control units such as CPUs, and executes prescribed functions. The control device 120 can provide the vehicle management server 200 with information (for example, a device-specific ID, etc.) regarding the mobile device 300 connectable with the vehicle 100 by short distance wireless communication. The control device 120 can provide the vehicle management server 200 with information on the location of the vehicle 100 using a location positioning function, such as GPS mounted in the vehicle 100.

The display device 130 is an information terminal including a display screen that displays the state of the vehicle 100. The display device 130 can display a message transmitted through the wireless network from the vehicle management server 200. Examples of the display device 130 may include a multi-information display and a car navigation device mounted in the vehicle 100.

The mobile device 300 is an information terminal that is registered and managed in the vehicle management server 200 in association with the vehicle 100 so as to display the state of the vehicle 100 on the display screen. A current vehicle owner (new user) or the like can register the mobile device 300 in the vehicle management server 200 by himself. The mobile device 300 is communicably connected with the vehicle management server 200, and is able to provide its own location information to the vehicle management server 200 using a location positioning function, such as GPS, mounted in the mobile device 300. The mobile device 300 is also able to display a message transmitted from the vehicle management server 200. Examples of the mobile device 300 may include general-purpose devices, such as smartphones, tablet devices, or personal computers, used by the owner of the vehicle 100.

The vehicle management server 200 manages the mobile device or devices 300 that are associated with the vehicle 100 with respect to control of the vehicle 100. The mobile device 300 associated with the vehicle 100 with respect to control of the vehicle 100 refers to the mobile device 300 connectable to the control device 120 mounted in the vehicle 100 through the communication device 110. In one example, the mobile device 300 associated with the vehicle 100 with respect to control of the vehicle 100 is permitted to receive information regarding the state of the vehicle 100 (such as notification of start of program update, notification of completion of program download, and notification of completion of program update) and to transmit instruction (such as accepting program download, and accepting program start) for the notified requests. The mobile device 300 associated with the vehicle 100 with respect to control of the vehicle 100 may further be permitted to perform vehicle operations, such as locking and unlocking a vehicle door, and turning on and off a vehicle electric power source.

The vehicle management server 200 is typically configured by including a computer that includes a processor and a memory. As illustrated in FIG. 1, the vehicle management server 200 includes an acquisition unit 210, a determination unit 220, a notification unit 230, a storage unit 240, and a communication unit 250.

The acquisition unit 210 can acquire information indicating a positional relationship between one or more mobile devices 300 present around the vehicle 100 and the vehicle 100, i.e., a positional relationship between one or more mobile devices 300 and the control device 120, through the communication unit 250. The information indicating the positional relationship will be described later.

The determination unit 220 determines, based on the information indicating the positional relationship acquired by the acquisition unit 210, whether or not there is any mobile device 300 located outside a prescribed range from the vehicle 100. The prescribed range from the vehicle 100 may be set as a setting range that includes the control device 120. The setting range will be described later. The storage unit 240 has information (device-specific ID) on the mobile devices 300 registered in advance in association with the vehicle 100. Based on the information indicating the positional relationship acquired by the acquisition unit 210, the determination unit 220 determines whether each of the mobile devices 300 in association with the vehicle 100 is inside or outside the setting range.

When the determination unit 220 determines that there is a mobile device 300 that is located out of the setting range, the notification unit 230 determines whether or not the pertinent mobile device 300 is continuously out of the setting range for a set time or more. When the mobile device 300 is continuously out of the setting range for the set time or more, the notification unit 230 transmits a prescribed message to the mobile device 300 or the vehicle 100 through the communication unit 250. The set time can be set based on the frequency that the communication device 110 tries to communicate with the mobile devices 300 by short distance wireless communication, the cycle that the vehicle management server 200 acquires the information indicating the positional relationship from the vehicle 100, or the like.

Figure 2:
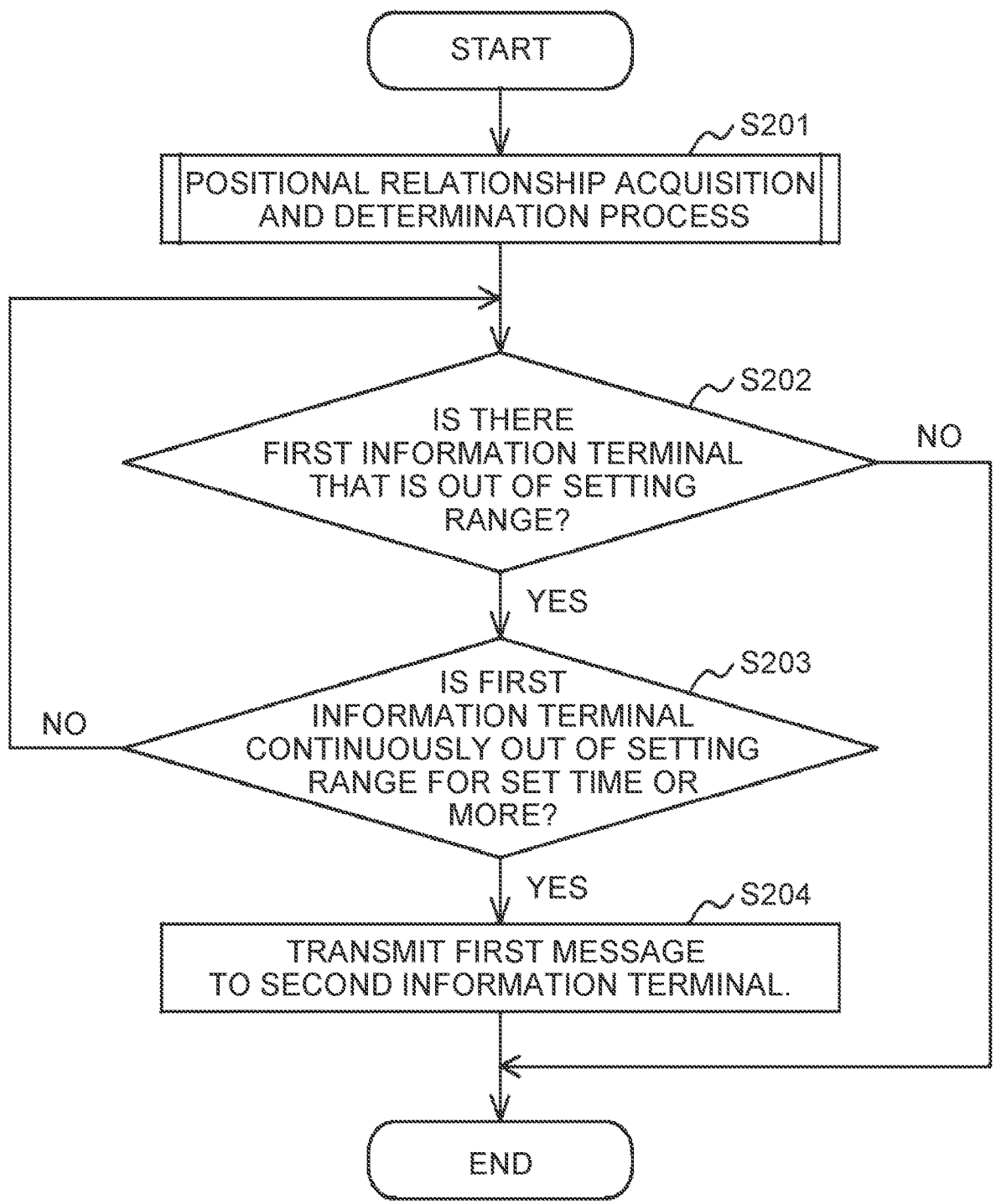
FIG. 2 is a flowchart of a vehicle management process executed on the vehicle management server.

FIG. 2 is a flowchart for describing procedures of a vehicle management process executed by the vehicle management server 200. For example, the process shown in FIG. 2 is started when the electric power source of the vehicle 100 is turned on.

Step S201: the acquisition unit 210 and the determination unit 220 of the vehicle management server 200 perform the process of acquiring the information indicating a positional relationship and determining the positional relationship. The process will be shown in three examples described later.

Step S202: the determination unit 220 of the vehicle management server 200 determines, based on the result of the process of step S201, whether there is any mobile device 300 (referred to as "first information terminal" below) that is out of the setting range. When there is the first information terminal (YES in step S202), the process proceeds to step S203. When there is no first information terminal (NO in step S202), the vehicle management process is ended.

Step S203: the notification unit 230 of the vehicle management server 200 determines whether or not the first information terminal is continuously out of the setting range for a set time or more. When there are two or more first information terminals, the notification unit 230 may determine whether or not at least one first information terminal is continuously out of the setting range for the set time or more. When the first information terminal is continuously out of the setting range for the set time or more (YES in step S203), the process proceeds to step S204. When the first information terminal is not continuously out of the setting range for the set time or more (NO in step S203), the process proceeds to step S202.

Step S204: the notification unit 230 of the vehicle management server 200 transmits a first message to the display device 130 of the mobile device 300 that is different from the first information terminal and/or the vehicle 100 (referred to as "second information terminal" below) through the communication unit 250. The mobile device 300 as the second information terminal may be present within the setting range, or may be present out of the setting range. Examples of the contents of the first message may include "there is a registered information terminal that is out of connection with the vehicle for long time", and "there is a registered information terminal other than this terminal". When there are a plurality of second information terminals, the first message may be transmitted to some of the second information terminals, or the first message may be transmitted to all the second information terminals. Once the first message is transmitted, the vehicle management process is ended.

FIRST EXAMPLE

Figure 3:
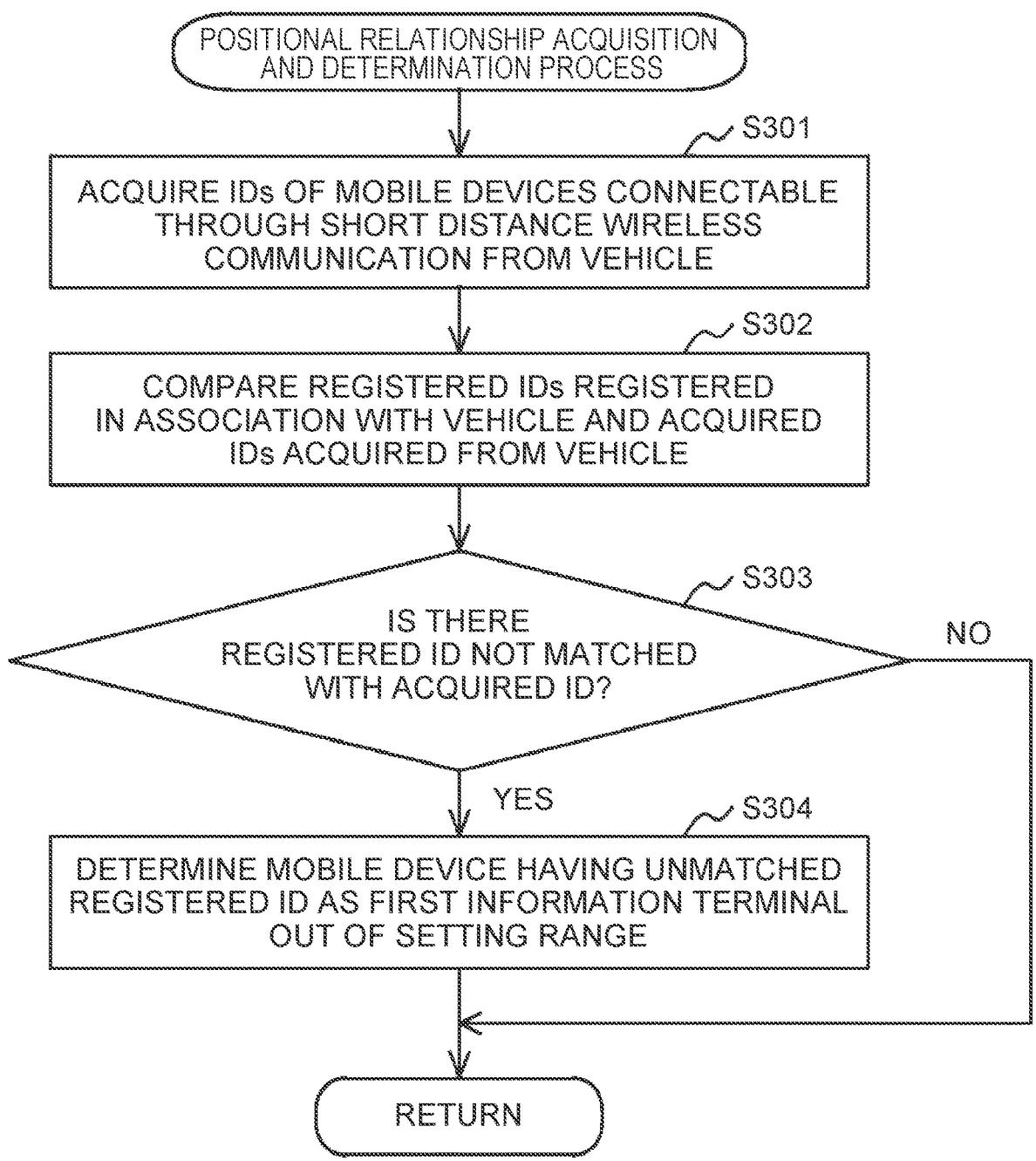
FIG. 3 is a detailed flowchart of a positional relationship acquisition and determination process (first example)

FIG. 3 is a detailed flowchart for illustrating a first example of the positional relationship acquisition and determination process executed in step S201 of FIG. 2.

Step S301: the acquisition unit 210 of the vehicle management server 200 acquires, as the information indicating a positional relationship, IDs (referred to as "acquired IDs" below) of the mobile devices 300 connectable with the vehicle 100 by short distance wireless communication, from the vehicle 100. The IDs may be acquired on a constant basis, or may periodically be acquired for a prescribed period. For example, the mobile devices 300 connectable with the vehicle 100 are mobile devices 300 that can be paired with the vehicle 100 by Bluetooth.

Step S302: the determination unit 220 of the vehicle management server 200 compares the acquired IDs acquired by the acquisition unit 210 with the IDs (referred to as "registered IDs" below) of the mobile devices 300 in association with the vehicle 100, the mobile devices 300 being registered in advance in the storage unit 240.

Step S303: the determination unit 220 of the vehicle management server 200 determines whether or not there is a registered ID that is not matched with the acquired IDs, among the registered IDs registered in advance in the storage unit 240. Here, the presence of the registered ID that is not matched with the acquired IDs signifies that the mobile device 300 having the pertinent registered ID has not connected to the vehicle 100 by short distance wireless communication. It can be said that the mobile device 300 that has not connected to the vehicle 100 by short distance wireless communication is not present around the vehicle 100, and therefore has a high possibility of being the information terminal registered by a past owner (former user).

When there is the registered ID that is not matched with the acquired IDs (YES in step S303), the process proceeds to step S304. When there is no registered ID that is not matched with the acquired IDs (NO in step S303), the positional relationship acquisition determination process is ended, and the process proceeds to step S202.

Step S304: the determination unit 220 of the vehicle management server 200 determines the mobile device 300 having the registered ID that is not matched with the acquired IDs as the first information terminal that is out of a setting range. Therefore, the setting range in this case is the range covered by an electric wave of the short distance wireless communication. When the first information terminal is determined, the positional relationship acquisition and determination process is ended, and the process proceeds to step S202.

Figure 6:
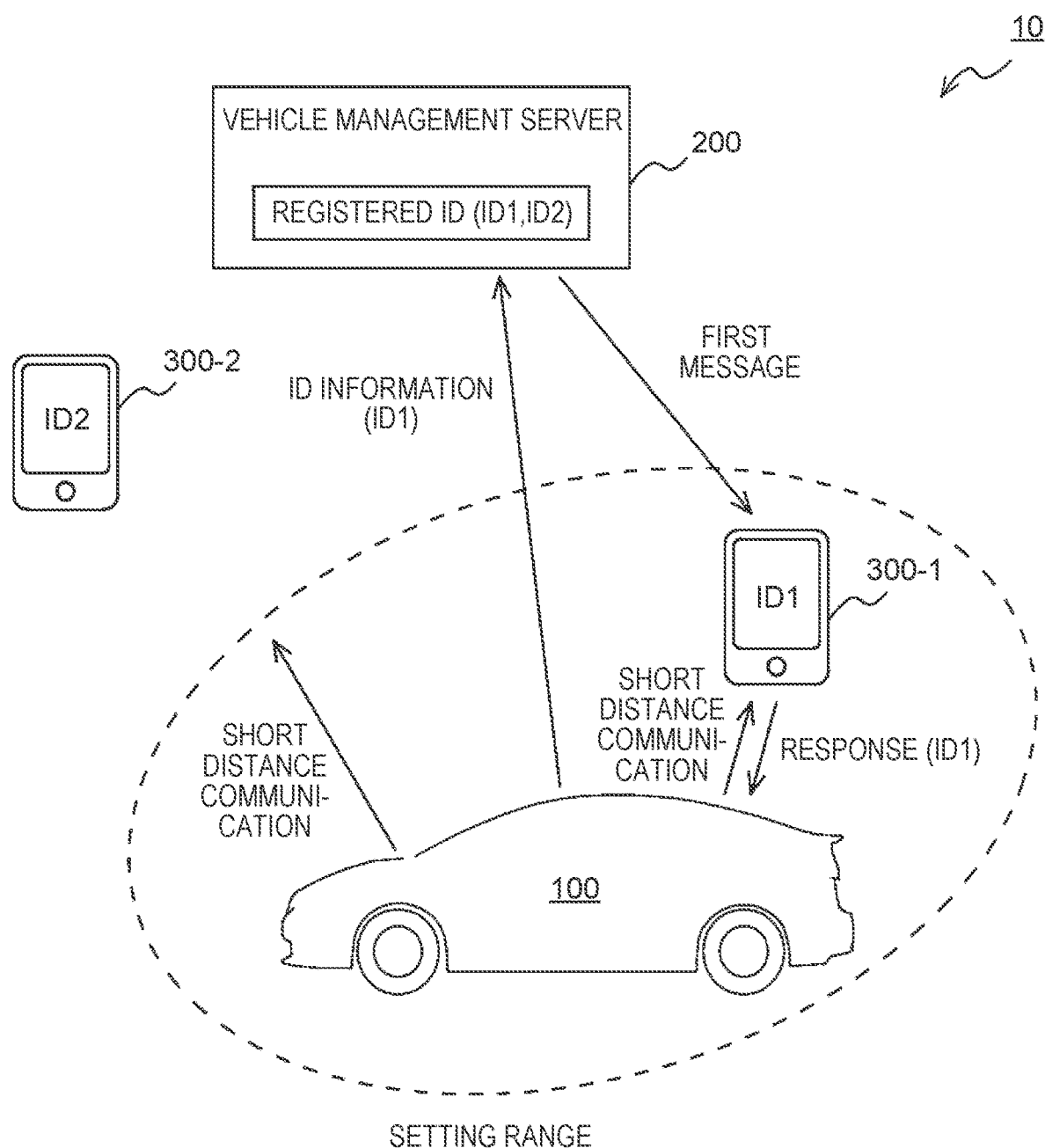
FIG. 6 is an image view illustrating the positional relationship in the positional relationship acquisition and determination process in the first example.

FIG. 6 is an image view illustrating the positional relationship in the positional relationship acquisition and determination process in the first example. A mobile device 300-1 that is inside a setting range (ellipse by a dotted line) is connected with the vehicle 100 by short distance wireless communication. Accordingly, ID information (ID1) regarding the mobile device 300-1 is transmitted to the vehicle management server 200. A mobile device 300-2 that is outside the setting range is not connected with the vehicle 100 by short distance wireless communication. Accordingly, ID information (ID2) regarding the mobile device 300-2 is not transmitted to the vehicle management server 200. Here, assume the case where "ID1" and "ID2" are registered in the vehicle management server 200 as the registered IDs in association with the vehicle 100. In this case, since only the "ID1" information can be acquired as the acquired ID from the vehicle 100, "ID2" is not matched with the acquired ID. Hence, the determination unit 220 determines the mobile device 300-2 having ID2 as the first information terminal (the mobile device 300-1 having ID1 is determined as a second information terminal). As a result of the determination, the notification unit 230 transmits a first message to the mobile device 300-1 that is the second information terminal.

SECOND EXAMPLE

Figure 4:
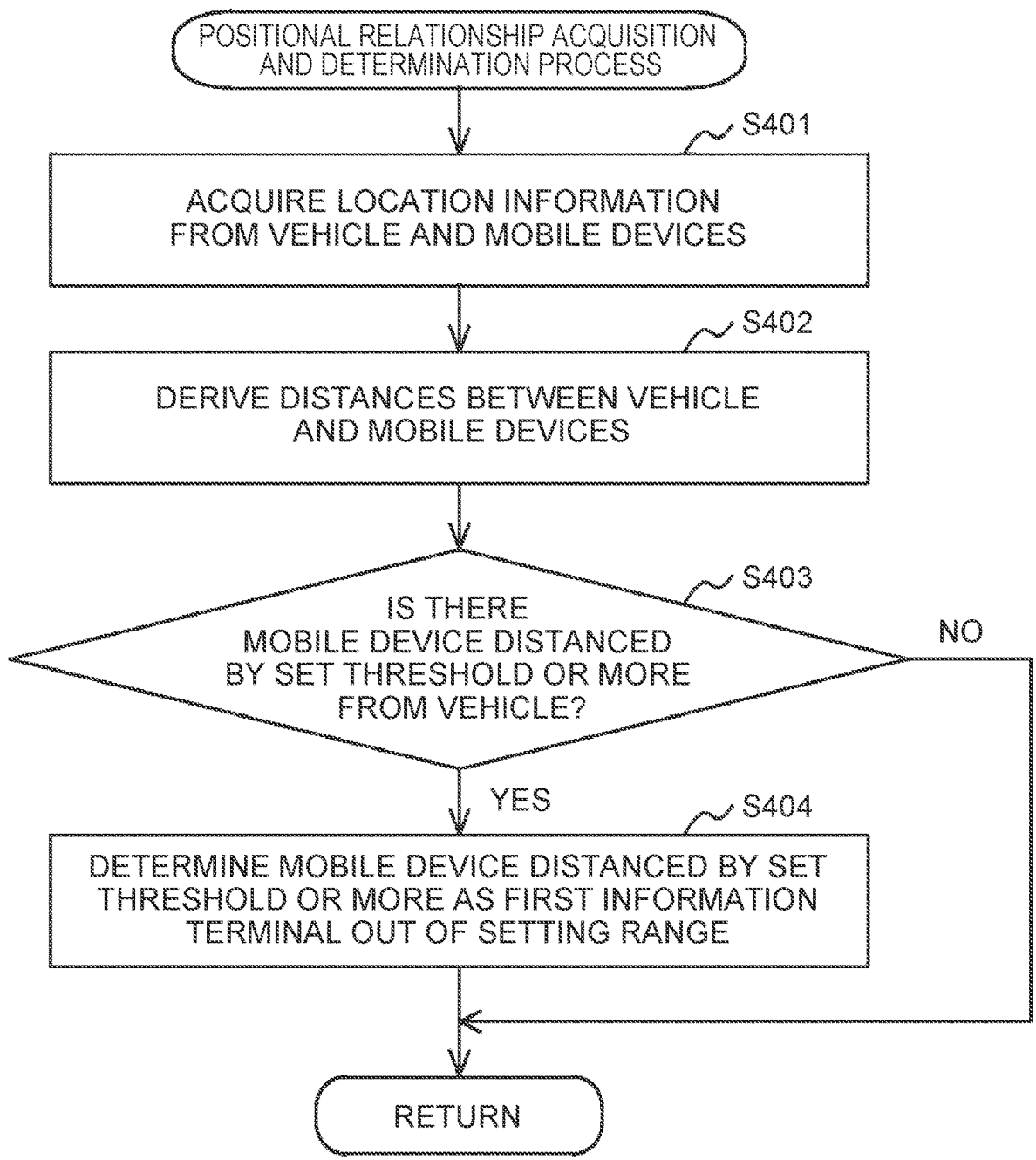
FIG. 4 is a detailed flowchart of the positional relationship acquisition and determination process (second example)

FIG. 4 is a detailed flowchart for illustrating a second example of the positional relationship acquisition and determination process executed in step S201 of FIG. 2.

Step S401: the acquisition unit 210 of the vehicle management server 200 acquires, as the information indicating a positional relationship, location information regarding the vehicle 100 and location information regarding all the mobile devices 300 that are registered in advance in the storage unit 240 in association with the vehicle 100, from the vehicle 100 and the mobile devices 300. The information may be acquired on a constant basis, or may periodically be acquired for a prescribed period. Examples of the location information may include information indicating latitude and longitude of each location.

Step S402: the determination unit 220 of the vehicle management server 200 derives, based on a plurality of pieces of location information acquired by the acquisition unit 210, distances between the vehicle 100 and the mobile devices 300, respectively.

Step S403: the determination unit 220 of the vehicle management server 200 determines, based on the derived distances, whether or not there is a mobile device 300 that is distanced by a set threshold or more from the vehicle 100. The set threshold can be set based on the form of usage (commuting, leisure) of the vehicle 100 by the owner, or the like. Accordingly, it can be surmised that the distance between the mobile device 300 and the vehicle 100 being a set threshold or more indicates that the mobile device 300 is not in an activity range of the owner. In other words, since the mobile device 300 that is distanced by the set threshold or more from the vehicle 100 is not present around the vehicle 100, there is a high possibility that the pertinent mobile device 300 is the information terminal registered by the past owner (former user).

When there is a mobile device 300 distanced by the set threshold or more from the vehicle 100 (YES in step S403), the process proceeds to step S404. When there is no mobile device 300 distanced by the set threshold or more from the vehicle 100 (NO in step S403), the positional relationship acquisition and determination process is ended, and the process proceeds to step S202.

Step S404: the determination unit 220 of the vehicle management server 200 determines the mobile device 300 distanced by the set threshold or more from the vehicle 100 as the first information terminal that is out of the setting range. Therefore, the setting range in this case is a circular range with the set threshold as a radius. When the first information terminal is determined, the positional relationship acquisition and determination process is ended, and the process proceeds to step S202.

Figure 7:
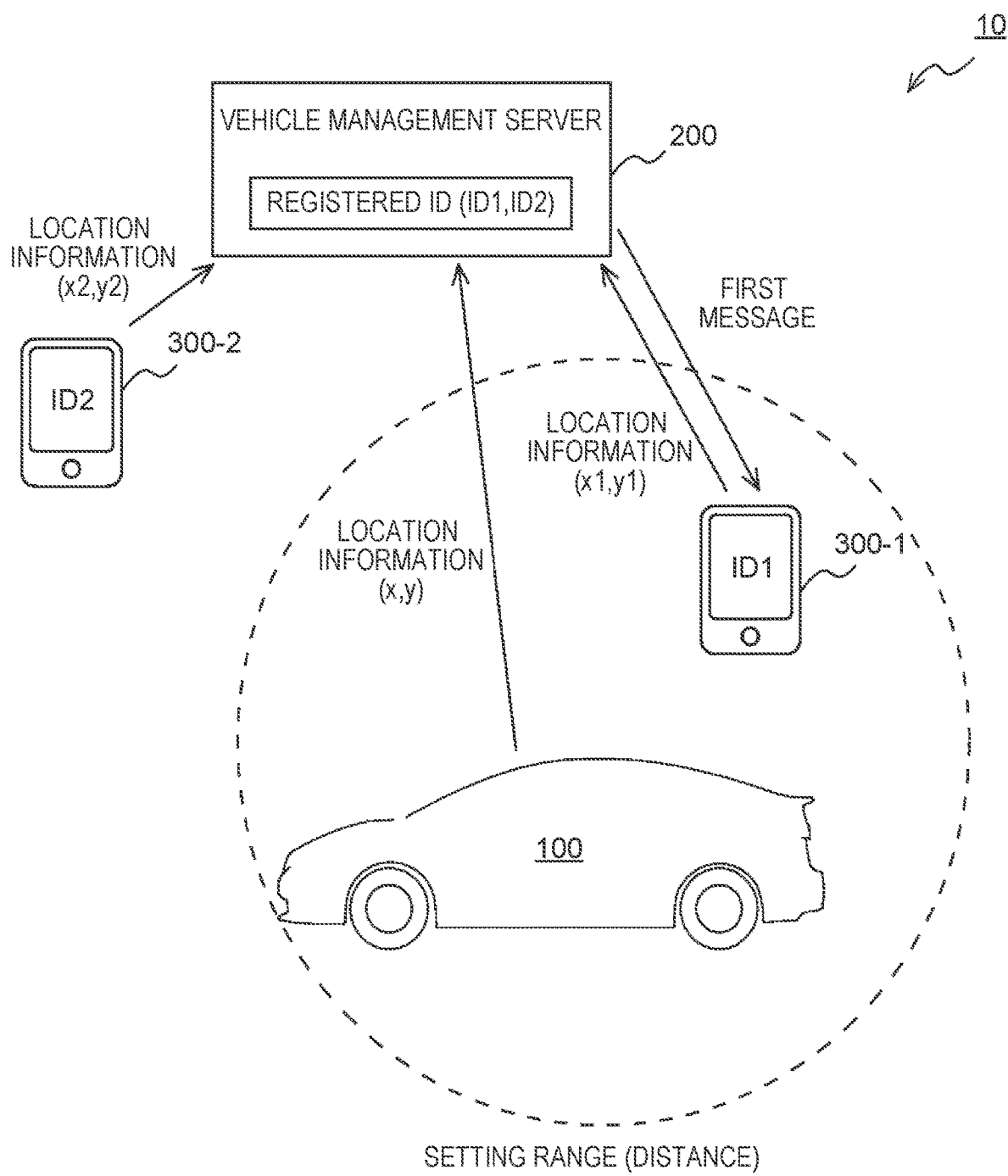
FIG. 7 is an image view illustrating the positional relationship in the positional relationship acquisition and determination process in the second example.

FIG. 7 is an image view illustrating the positional relationship in the positional relationship acquisition and determination process in the second example. The vehicle management server 200 acquires location information (x0, y0) from the vehicle 100, and further acquires location information (x1, y1) from the mobile device 300-1 having a registered ID "ID1" associated with the vehicle 100, and location information (x2, y2) from the mobile device 300-2 having a registered ID "ID2", respectively. Here, the distance ($=\sqrt{\{(x0-x1)^2+(y0-y1)^2\}}$) between the vehicle 100 and the mobile device 300-1 becomes less than the set threshold, and the distance ($=\sqrt{\{(x0-x2)^2+(y0-y2)^2\}}$) between the vehicle 100 and the mobile device 300-2 becomes the set threshold or more. Hence, the determination unit 220 determines the mobile device 300-2 having ID2 as the first information terminal (the mobile device 300-1 having ID1 is determined as the second information terminal). As a result of the determination, the notification unit 230 transmits a first message to the mobile device 300-1 that is the second information terminal.

THIRD EXAMPLE

Figure 5:
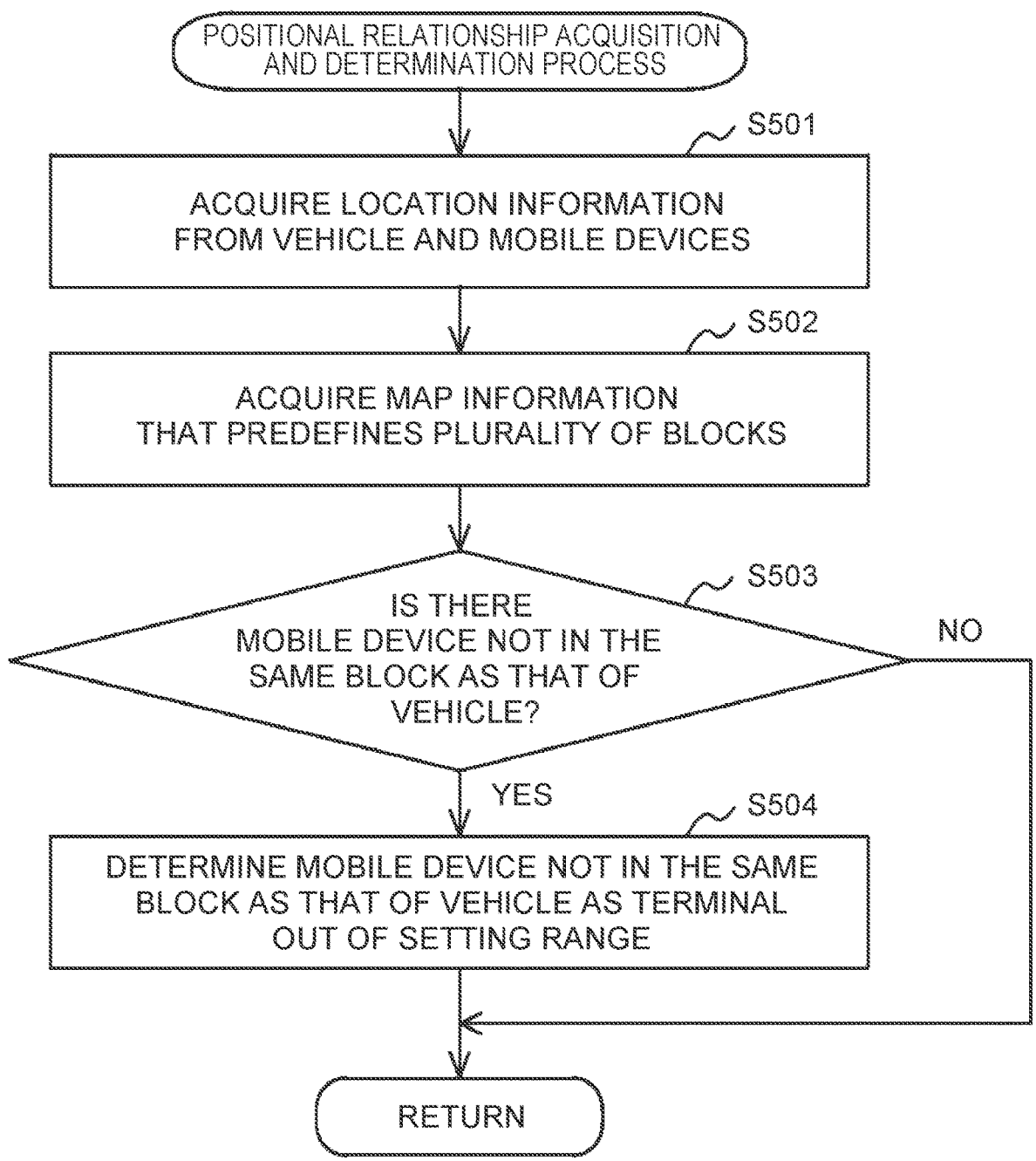
FIG. 5 is a detailed flowchart of the positional relationship acquisition and determination process (third example)

FIG. 5 is a detailed flowchart for illustrating a third example of the positional relationship acquisition and determination process executed in step S201 of FIG. 2.

Step S501: the acquisition unit 210 of the vehicle management server 200 acquires, as the information indicating a positional relationship, location information regarding the vehicle 100 and location information regarding all the mobile devices 300 that are registered in advance in the storage unit 240 in association with the vehicle 100, from the vehicle 100 and the mobile devices 300. The information may be acquired on a constant basis, or may periodically be acquired for a prescribed period. Examples of the location information may include information indicating latitude and longitude of each location.

Step S502: the acquisition unit 210 of the vehicle management server 200 acquires map information that predefines a plurality of blocks. The map information may be stored in the storage unit 240 of the vehicle management server 200 in advance, may be acquired from the vehicle 100, or may be acquired from external equipment (not illustrated) that manages the map information. Examples of the blocks defined in the map information may include prefectures, or cities, towns and villages.

Step S503: the determination unit 220 of the vehicle management server 200 determines, based on the location information regarding the vehicle 100 and the mobile devices 300 and on the map information, whether or not there is a mobile device 300 not in the same block as that of the vehicle 100. For example, assume the case where the vehicle 100 is in Toyota city in Aichi Prefecture, and the mobile device 300 is in Nagoya city in Aichi Prefecture. When the blocks are defined as prefectures, the vehicle 100 and the mobile device 300 are in the same block. When the blocks are defined as cities, towns and villages, the vehicle 100 and the mobile device 300 are not in the same block. It can be surmised that the mobile device 300 that is not in the same block as that of the vehicle 100 is not in the activity region of the owner of the vehicle 100. In other words, since the mobile device 300 that is not in the same block as that of the vehicle 100 is not present around the vehicle 100, there is a high possibility that the pertinent mobile device 300 is the information terminal registered by the past owner (former user).

When there is a mobile device 300 that is not in the same block from that of the vehicle 100 (YES in step S503), the process proceeds to step S504. When there is no mobile device 300 that is not in the same block as that of the vehicle 100 (NO in step S503), the positional relationship acquisition and determination process of this time is ended, and the process proceeds to step S202.

Step S504: the determination unit 220 of the vehicle management server 200 determines the mobile device 300 that is not in the same block as that of the vehicle 100 as the first information terminal that is out of the setting range. Therefore, the setting range in this case has the shape of a block. When the first information terminal is determined, the positional relationship acquisition and determination process is ended, and the process proceeds to step S202.

Figure 8:
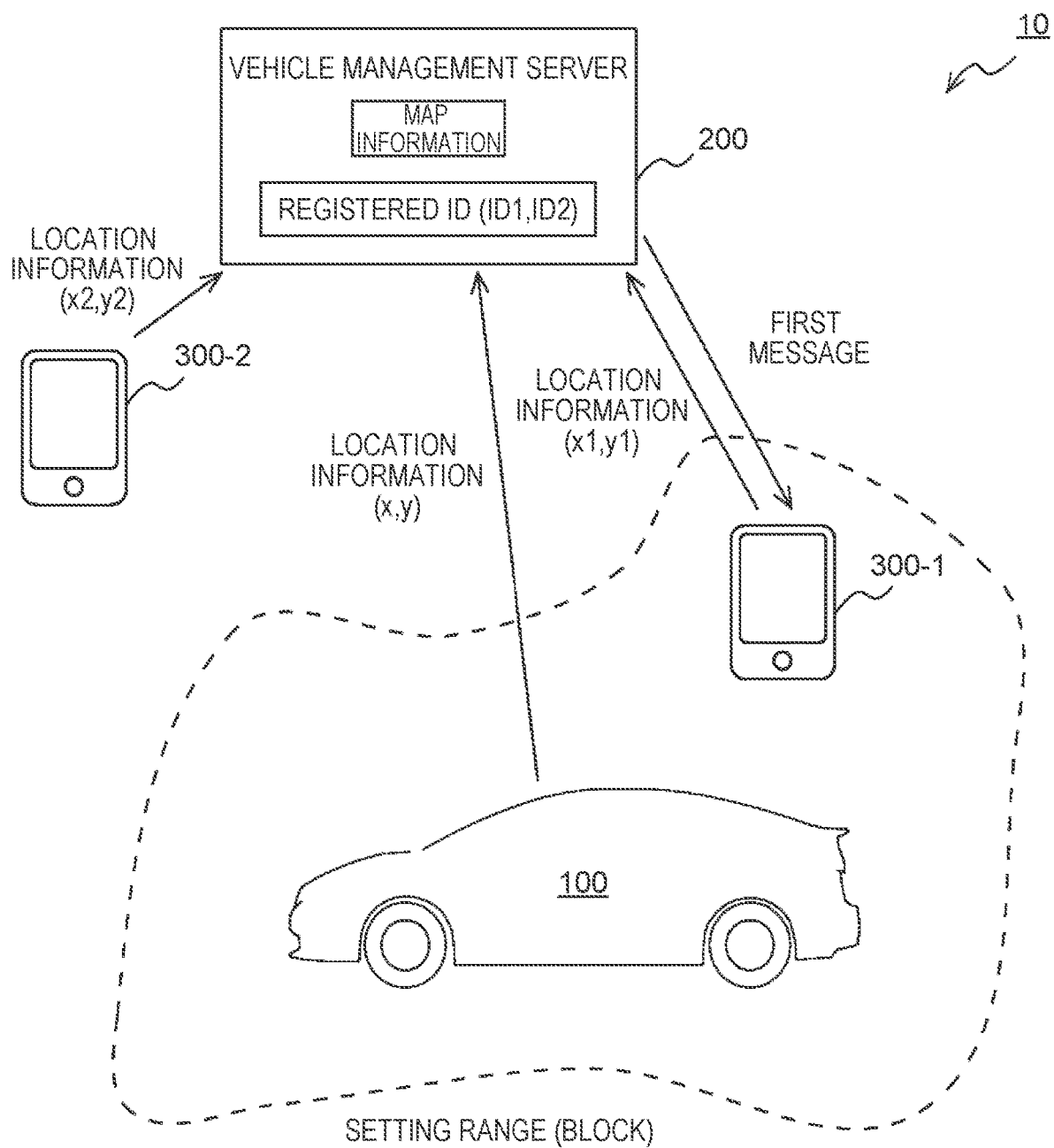
FIG. 8 is an image view illustrating the positional relationship in the positional relationship acquisition and determination process in the third example.

FIG. 8 is an image view illustrating the positional relationship in the positional relationship acquisition and determination process in the third example. The vehicle management server 200 acquires location information (x0, y0) from the vehicle 100, and further acquires location information (x1, y1) from the mobile device 300-1 having a registered ID "ID1" associated with the vehicle 100, and location information (x2, y2) from the mobile device 300-2 having a registered ID "ID2", respectively. The vehicle management server 200 also acquires the map information that defines blocks. Here, the vehicle 100 and the mobile device 300-1 are in the same block (dotted line range), and the vehicle 100 and the mobile device 300-2 are not in the same block. Hence, the determination unit 220 determines the mobile device 300-2 having ID2 as the first information terminal (the mobile device 300-1 having ID1 is determined as the second information terminal). As a result of the determination, the notification unit 230 transmits a first message to the mobile device 300-1 that is the second information terminal.

In the case of the third example, the setting range that is a determination area is large. Accordingly, there is a higher possibility that the mobile device 300 that should essentially be determined as a first information terminal is determined as a second information terminal. Therefore, in order to prevent transmission of the first message to the mobile device 300 that is erroneously determined as a second information terminal, whether a movement trajectory of the vehicle 100 is matched or not matched with a movement trajectory of the second information terminal may be determined based on the location information, and the first message may be transmitted only to the second information terminal having a movement trajectory matched with that of the vehicle 100. In the case of the third example, it is considered that the mobile device 300 that is not in the same block as that of the vehicle 100 has a low possibility of moving to the same block in a short time. Accordingly, when it is determined that there is the mobile device 300 that is not in the same block as that of the vehicle 100 in step S503, the first message may be transmitted to the second information terminal at step S204, without determining whether or not the mobile device 300 (first information terminal) is continuously out of the setting range for a set time or more in step S203.

APPLICATION EXAMPLE

Figure 9:
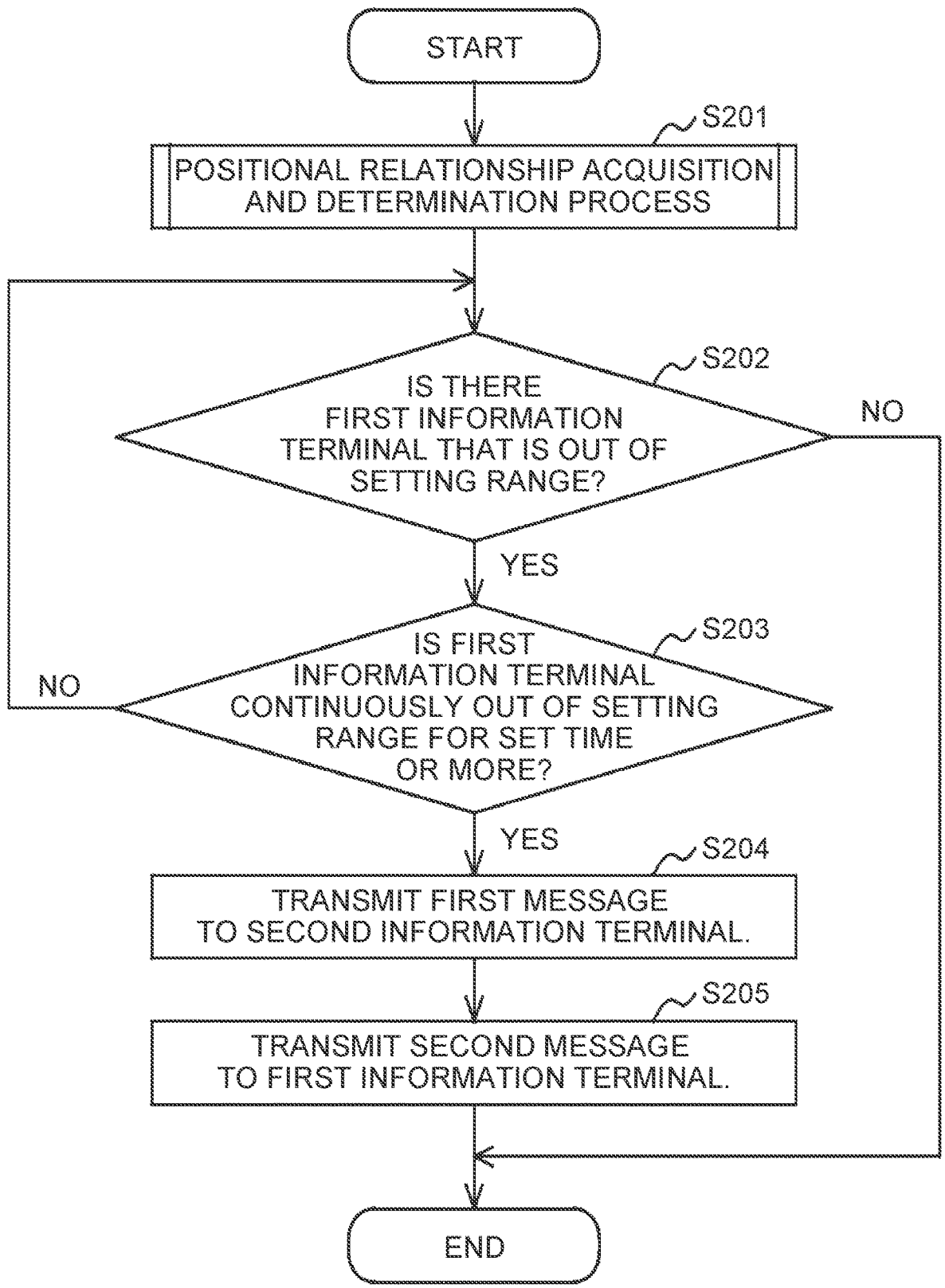
FIG. 9 is a flowchart of an application example of the vehicle management process executed on the vehicle management server.

FIG. 9 is a flowchart for describing an application example of the vehicle management process executed by the vehicle management server 200. In the application example, step S205 is further added to the vehicle management process shown in FIG. 2.

In the vehicle management process shown in FIG. 2, the first message is transmitted to only the second information terminal that is within the setting range (step S204). However, in the vehicle management process shown in FIG. 9, a second message is also transmitted to the first information terminal that is out of the setting range. Examples of the contents of the second message may include "this information terminal may be registered in association with the vehicle you do not own. Remove registration if necessary" and "this information terminal may be in contract with the vehicle you do not own. Cancel the contract if necessary". When there are a plurality of first information terminals, the second message may be transmitted to some of the first information terminals, or the second message may be transmitted to all the first information terminals.

As described above, according to the vehicle management server, the vehicle management method, and the non-transitory storage medium according to one embodiment of the present disclosure, the positional relationship between a vehicle and a plurality of mobile devices present around the vehicle is periodically determined, the mobile devices being associated with the vehicle. When there is the mobile device that is out of a setting range based on the vehicle, or the mobile device (first information terminal) that is continuously out of the setting range for a set time or more, a first message indicating the presence of the mobile device (first information terminal) having a low possibility of being connected to the vehicle is notified to the mobile device (second information terminals) that is different from the first information terminal.

With the process, a new user who owns the vehicle can recognize, upon reception of the notification via the second information terminal, the possibility that the mobile device of the former user may stay registered in association with the vehicle.

The setting range may be set as a range where the vehicle and the mobile devices are connectable by short distance wireless communication, may be set as a range where the vehicle is distanced by less than a set threshold from the mobile devices, or may be set as a range where the vehicle and the mobile devices are present in the same block. This makes it possible to adequately determine that the mobile device (first information terminal) that is out of the setting range based on the vehicle is the mobile device of the former user.

Although one embodiment of the present disclosure has been described in the foregoing, the present disclosure may be defined as a vehicle management server, a vehicle management method executed by the vehicle management server including a processor and a memory, a computer-readable non-transitory storage medium that stores a vehicle management program and a control program for executing the vehicle management method, a vehicle management system including the vehicle management server and a vehicle, and the like.

The present disclosure is applicable to servers that manage vehicles, and the like.

What is claimed is:

1. An information processing device, comprising:
   a memory; and
   one or more processor configured to:
   acquire information indicating a positional relationship between a vehicle and a first information terminal that is registered in association with the vehicle in the memory by a former user; and
   transmit a first message to a second information terminal and transmit a second message to the first information terminal based on the information indicating the positional relationship between the first information terminal and the vehicle, the second information terminal being different from the first information terminal and being registered in association with the vehicle in the memory by a new user.

2. The information processing device according to claim 1, wherein the one or more processor is configured to transmit the first message to the second information terminal based on the information indicating the positional relationship between the first information terminal and the vehicle and a duration of the positional relationship between the first information terminal and the vehicle.

3. The information processing device according to claim 1, wherein the information indicating the positional relationship between the first information terminal and the vehicle includes information indicating whether the first information terminal located within a range where the first information terminal is able to communicate with the vehicle using a predetermined communication method.

4. The information processing device according to claim 1, wherein the information indicating the positional relationship between the first information terminal and the vehicle includes information indicating a distance between the first information terminal and the vehicle.

5. The information processing device according to claim 4, wherein the one or more processor is configured to transmit the first message to the second information terminal on a condition that the distance between the first information terminal and the vehicle is larger than a predetermined distance.

6. The information processing device according to claim 1, wherein the information indicating the positional relationship between the first information terminal and the vehicle includes block information indicating a location of the first information terminal and block information indicating a location of the vehicle.

7. The information processing device according to claim 1, wherein the first information terminal and the second information terminal are each configured to:
   notify a start of a program update by the vehicle,
   notify a completion of a program download by the vehicle, and
   notify a completion of the program update by the vehicle.

8. The information processing device according to claim 1, wherein
   the first information terminal and the second information terminal are each configured to accept vehicle operations, and
   the vehicle operations include:
   locking and unlocking a vehicle door, and
   turning on and off a vehicle electric power source.

9. The information processing device according to claim 1, wherein the first message is displayed on the second information terminal.

10. The information processing device according to claim 1, wherein the memory is configured to store information on an information terminal in association with the vehicle, and the one or more processor is configured to
    receive information on an information terminal with which the vehicle connects by short distance wireless communication and not to receive information on an information terminal with which the vehicle does not connect by the short distance wireless communication, from the vehicle,
    compare the received information on the information terminal with which the vehicle connects with the stored information in the memory, and
    determine the information terminal on which information is not received by the processor from the vehicle and is stored in the memory as the first information terminal.

11. The information processing device according to claim 1, wherein the first message indicates that there is a registered information terminal other than the second terminal.

12. An information processing method, comprising:
    acquiring information indicating a positional relationship between a vehicle and a first information terminal that is registered in association with the vehicle in a memory by a former user; and
    transmitting a first message to a second information terminal and transmit a second message to the first information terminal based on the information indicating the positional relationship between the first information terminal and the vehicle, the second information terminal being different from the first information terminal and being registered in association with the vehicle in the memory by a new user.

13. The information processing method according to claim 12, wherein the first message is transmitted to the second information terminal based on the information indicating the positional relationship between the first information terminal and the vehicle and a duration of the positional relationship between the first information terminal and the vehicle.

14. The information processing method according to claim 12, wherein the information indicating the positional relationship between the first information terminal and the vehicle includes information indicating whether the first information terminal located within a range where the first information terminal is able to communicate with the vehicle using a predetermined communication method.

15. The information processing method according to claim 12, wherein the information indicating the positional relationship between the first information terminal and the vehicle includes information indicating a distance between the first information terminal and the vehicle.

16. The information processing method according to claim 15, wherein the first message is transmitted to the second information terminal on a condition that the distance between the first information terminal and the vehicle is larger than a predetermined distance.

17. The information processing method according to claim 12, wherein the information indicating the positional relationship between the first information terminal and the vehicle includes block information indicating a location of the first information terminal and block information indicating a location of the vehicle.

18. A non-transitory storage medium for storing commands that are executable by one or more processor and that cause the one or more processor to execute functions, the functions comprising:
    acquiring information indicating a positional relationship between a vehicle and a first information terminal that is registered in association with the vehicle in a memory by a former user; and
    transmitting a first message to a second information terminal and transmit a second message to the first information terminal based on the information indicating the positional relationship between the first information terminal and the vehicle, the second information terminal being different from the first information terminal and being registered in association with the vehicle in the memory by a new user.

* * * * *